United States Patent
Li et al.

(10) Patent No.: US 9,003,154 B2
(45) Date of Patent: Apr. 7, 2015

(54) DEVICE REQUIRING ADDRESS ALLOCATION, DEVICE SYSTEM AND ADDRESS ALLOCATION METHOD

(75) Inventors: Chunyi Li, Shanghai (CN); Qingjiang Ma, Shanghai (CN)

(73) Assignee: Montage Technology (Shanghai) Co., Ltd., Shanghai (CN)

( * ) Notice: Subject to any disclaimer, the term of this patent is extended or adjusted under 35 U.S.C. 154(b) by 188 days.

(21) Appl. No.: 13/586,317

(22) Filed: Aug. 15, 2012

(65) Prior Publication Data

US 2013/0124816 A1 May 16, 2013

(30) Foreign Application Priority Data

Nov. 10, 2011 (CN) .......................... 2011 1 0353925

(51) Int. Cl.
   *G06F 12/02* (2006.01)
   *G06F 13/16* (2006.01)
   *G06F 12/06* (2006.01)

(52) U.S. Cl.
   CPC ............ *G06F 12/0669* (2013.01); *G06F 13/16* (2013.01)

(58) Field of Classification Search
   None
   See application file for complete search history.

(56) References Cited

U.S. PATENT DOCUMENTS

| | | | | |
|---|---|---|---|---|
| 4,408,297 A * | 10/1983 | Theodosiou et al. | ......... | 702/176 |
| 4,467,270 A * | 8/1984 | McElroy et al. | ............... | 324/503 |
| 4,603,382 A * | 7/1986 | Cole et al. | ........................ | 710/56 |
| 4,703,483 A * | 10/1987 | Enomoto et al. | .............. | 714/735 |
| 4,899,274 A * | 2/1990 | Hansen et al. | ................ | 709/222 |
| 4,954,951 A * | 9/1990 | Hyatt | ............................. | 711/218 |
| 5,687,368 A * | 11/1997 | Nilsen | ........................... | 707/103 |
| 8,291,269 B1 * | 10/2012 | Ro et al. | .......................... | 714/49 |
| 2002/0006117 A1 * | 1/2002 | Duske, Jr. et al. | ............ | 370/316 |
| 2005/0104985 A1 * | 5/2005 | Abe et al. | ....................... | 348/308 |
| 2006/0271969 A1 * | 11/2006 | Takizawa et al. | ............... | 725/81 |
| 2009/0135769 A1 * | 5/2009 | Sambhwani et al. | ......... | 370/329 |
| 2011/0219208 A1 * | 9/2011 | Asaad et al. | .................... | 712/12 |

* cited by examiner

Primary Examiner — Daniel J Bernard
(74) Attorney, Agent, or Firm — Oliff PLC

(57) ABSTRACT

A device requiring address allocation, a device system, and an address allocation method. A control device in the device system transmits currently allocated address information and a contention start signal to each device requiring address allocation in the device system through a bus, and the devices requiring address allocation with address allocation flag information being that no address information is allocated output an address contention signal. When outputting the address contention signal, each device requiring address allocation determines whether the currently allocated address information is available according to whether the other devices requiring address allocation with address allocation flag information being that no address information is allocated already output address contention signals. When determining availability of currently allocated address information, the device requiring address allocation stores currently allocated address information, and modifies address allocation flag information to address information already allocated, thereby achieving address allocation for the devices.

10 Claims, 12 Drawing Sheets

DEVICE REQUIRING ADDRESS ALLOCATION, DEVICE SYSTEM AND ADDRESS ALLOCATION METHOD

BACKGROUND OF THE PRESENT INVENTION

1. Field of Invention

The present invention relates to the field of address allocation, and more specifically to a device requiring address allocation, a device system and an address allocation method.

2. Description of Related Arts

In an existing device connected based on a bus, generally only an address register is disposed to store address information, and a matching device such as a coder is used to write allocated address information to the address register.

For example, a device system shown in FIG. 1 includes a master controller, a device 1, a device 2, . . . , and a device n connected based on a bus. Before the devices 1, 2, . . . , and n connected in parallel on the bus communicate with the master controller, the coder writes addresses one by one, so that the devices 1, 2, . . . , and n can correctly receive information transmitted thereto from the master controller through the bus based on the address information stored in the address registers thereof.

For another example, a memory module shown in FIG. 2 includes a plurality of data buffers and a control buffer connected through a bus. When a tester needs to test or calibrate one or more data buffers, a matching memory controller often needs to be used to allocate address information to each data buffer respectively, and then each data buffer receives command information or control information from the bus based on the address information stored in the address register thereof, so as to determine whether each data buffer can work normally. Obviously, such a testing or calibration method is inconvenient for memory module manufacturers who have to prepare matching memory controllers by themselves.

It can be seen from the above that, due to the structural limitation of the existing device, address allocation cannot be implemented without a matching device, making it rather inconvenient to allocate addresses.

SUMMARY OF THE PRESENT INVENTION

In view of the disadvantages in the prior art, an object of the present invention is to provide a device requiring address allocation, which can acquire address information thereof based on contention.

Another object of the present invention is to provide a device system capable of acquiring address information based on contention.

Still another object of the present invention is to provide an address allocation method, which achieves address allocation for devices.

In order to accomplish the above and other objects, the device requiring address allocation provided in the present invention at least comprises: a storage unit, for storing address allocation flag information and address information; a contention signal output unit, connected to the storage unit, and for outputting an address contention signal after a random duration after the contention start signal is received, when the address allocation flag information is that no address information is allocated; and an address configuration unit, for determining, when the contention signal output unit outputs the address contention signal, whether pre-allocated address information is available according to whether other devices requiring address allocation with address allocation flag information being that no address information is allocated already output address contention signals, and when the pre-allocated address information is available, writing the pre-allocated address information to the storage unit, and modifying the address allocation flag information to that address information is already allocated.

Preferably, the device requiring address allocation further comprises a wired logic unit, connected to an output terminal of the contention signal output unit, so that after an output terminal of the wired logic unit is connected with output terminals of wired logic units of other devices requiring address allocation, an interconnect signal line forms a wired-AND logic or a wired-OR logic.

Preferably, the device requiring address allocation further comprises an interconnect line level output unit, for, upon receiving the contention start signal, outputting a signal for enabling a level of the output terminal of the wired logic unit comprised in the device requiring address allocation to be a first level if the address allocation flag information is that address information is already allocated, and outputting a signal for enabling the level of the output terminal of the wired logic unit comprised in the device requiring address allocation to be a second level if the address allocation flag information is that no address information is allocated; a modification unit, for modifying the address allocation flag information to that no address information is allocated, upon receiving a signal for modifying the address allocation flag information to that no address information is allocated; and a delay unit, for outputting an activating signal to activate the contention signal output unit after a predetermined delay after the contention start signal is received, so that the contention signal output unit outputs an address contention signal after a random duration after the predetermined delay after the contention start signal is received.

The device system provided in the present invention at least comprises: a plurality of devices requiring address allocation connected based on a bus; and a control device connected to the bus.

Preferably, each device requiring address allocation is a data buffer, the control device is a control buffer, and the device system is a memory module.

The address allocation method provided in the present invention is applied to the device system, and at least comprises: i) the control device in the device system transmitting currently allocated address information to each device requiring address allocation in the device system through a bus; 1) the control device transmitting a contention start signal to each device requiring address allocation through the bus; 2) after all the devices requiring address allocation receive the contention start signal, the devices requiring address allocation with address allocation flag information being that no address information is allocated outputting an address contention signal respectively after respective random durations; 3) when outputting the address contention signal, each of the devices requiring address allocation with address allocation flag information being that no address information is allocated determining whether the currently allocated address information is available according to whether the other devices requiring address allocation with address allocation flag information being that no address information is allocated already output the address contention signals; and 4) when determining that the currently allocated address information is available, the device requiring address allocation storing the currently allocated address information, and modifying the address allocation flag information thereof to that address information is already allocated.

Preferably, when signals output by respective contention signal output units of all the devices requiring address allocation form a wired-AND logic or a wired-OR logic, the device requiring address allocation determines that the currently allocated address information is available based on the output address contention signal thereof and a level of an interconnect signal line of the wired-AND logic or the wired-OR logic.

Preferably, the address allocation method further comprises: repeating the steps i), 1), 2), 3) and 4) to complete allocation of a next address, until all the devices requiring address allocation are allocated with addresses.

Preferably, the step 2) further comprises: after all the devices requiring address allocation receive the contention start signal, each of the devices requiring address allocation with address allocation flag information being that address information is already all outputting a signal for enabling a level of an output terminal of a wired logic unit comprised in the device requiring address allocation to be a first level, each of the devices requiring address allocation with address allocation flag information being that no address information is allocated outputting a signal for enabling a level of an output terminal of a wired logic unit comprised in the device requiring address allocation to be a second level, and the devices requiring address allocation with address allocation flag information being that no address information is allocated outputting an address contention signal respectively after respective random durations after a predetermined delay after receiving the contention start signal; and the address allocation method further comprises: if the control device determines that the level of the interconnect signal line is the first level after a predetermined duration after transmitting the contention start signal through the bus, the control device transmitting a signal for modifying the address allocation flag information to that no address information is allocated to each device requiring address allocation through the bus, so as to implement address re-allocation starting from first address information.

As described above, the present invention has the following beneficial effects: devices requiring address allocation acquire address information thereof based on a contention mechanism, and writing of addresses does not require the matching device in the prior art, but can be performed simply through an apparatus capable of sending contention start signals, so that the address allocation is quite convenient, and especially for address allocation for data buffers in a memory module, the address allocation can be performed directly by a control buffer in a memory buffer without requiring any memory controller, thereby facilitating a tester to test or calibrate the memory module.

DETAILED DESCRIPTION OF THE PREFERRED EMBODIMENTS

The embodiments of the present invention are described in the following through specific examples, and those with ordinary skill in the art can easily understand other advantages and effects of the present invention according to the content disclosed in the specification. The present invention may also be implemented or applied through other different specific examples, and various modifications and variations may be made to the details in the specification on the basis of different opinions and applications without departing from the principle of the present invention.

Reference is made to FIG. 3 to FIG. 12. It should be noted that, the drawings provided in the embodiment merely exemplarily describes a basic concept of the present invention, the drawings merely show components related to the present invention, but are not drawn according to the numbers, shapes and sizes of components in actual implementation. The shapes, the numbers and the sizes of the components can be randomly changed in the actual implementation, and the layout of components may be more complicated.

Figure 1:
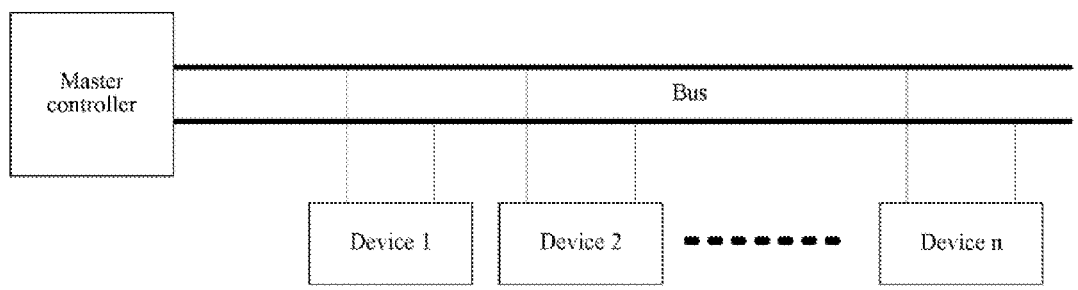
FIG. 1 is a schematic view of a device system connected based on a bus.
Figure 2:
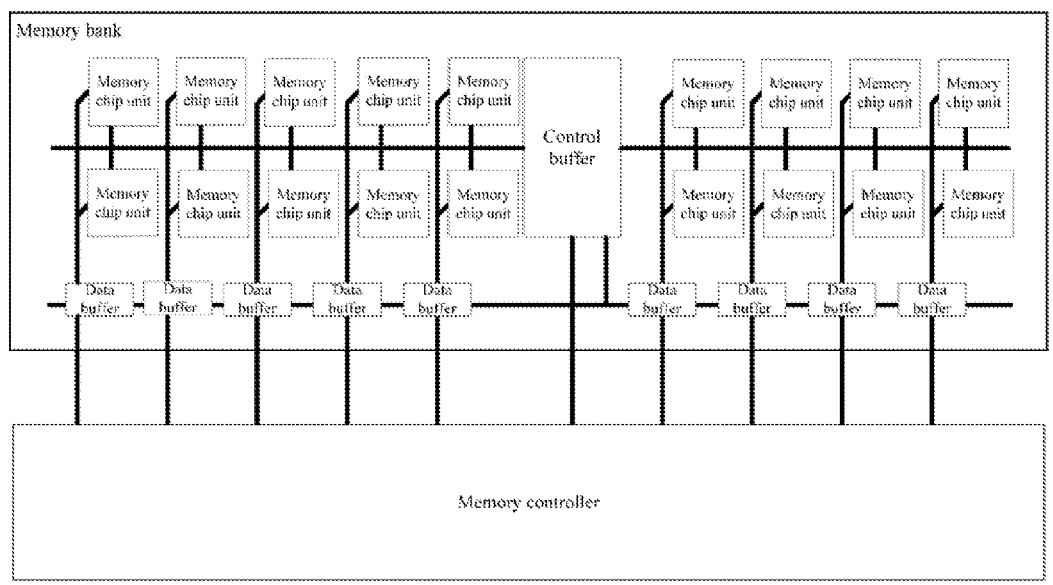
FIG. 2 is a schematic view of an existing memory module.
Figure 3:
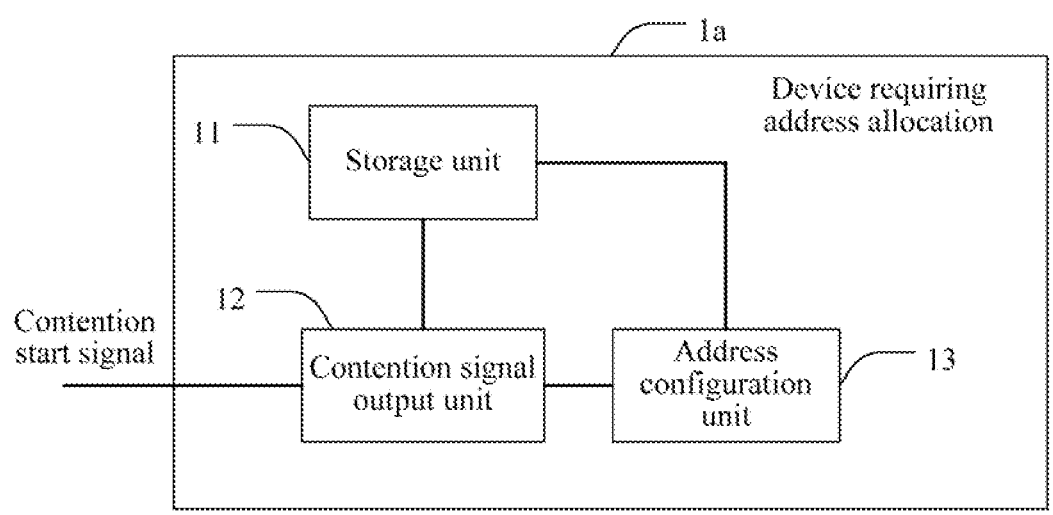
FIG. 3 is a schematic view of a device requiring address allocation consistent with the present invention.

FIG. 3 is a schematic view of a preferred device 1a requiring address allocation consistent with the present invention. The device 1a requiring address allocation at least includes a storage unit 11, a contention signal output unit 12 and an address configuration unit 13.

The storage unit 11 is used for storing address allocation flag information and address information. The address allocation flag information is information for indicating whether an address is already allocated. For example, if a first signal such as a signal "1" is used to indicate that an address is already allocated and a second signal such as a signal "0" is used to indicate that no address is allocated, when the device 1a requiring address allocation is already allocated with an address, the address allocation flag information stored in the storage unit 11 is the first signal; otherwise, the address allocation flag information stored in the storage unit 11 is the second signal.

Preferably, the storage unit 11 includes a register or the like.

The contention signal output unit 12 is connected to the storage unit 11, and used for outputting an address contention signal after a random duration after the contention start signal is received, when the address allocation flag information is that no address information is allocated.

The contention start signal is any signal for indicating start of address contention, for example, a control device broadcasts, through a bus, a start for starting allocation of a certain address such as an address "0" to the device 1a requiring address allocation. The address contention signal is any signal for competing with other devices requiring address allocation for an address, and is, for example, a signal "1" or a signal "0".

Figure 4:
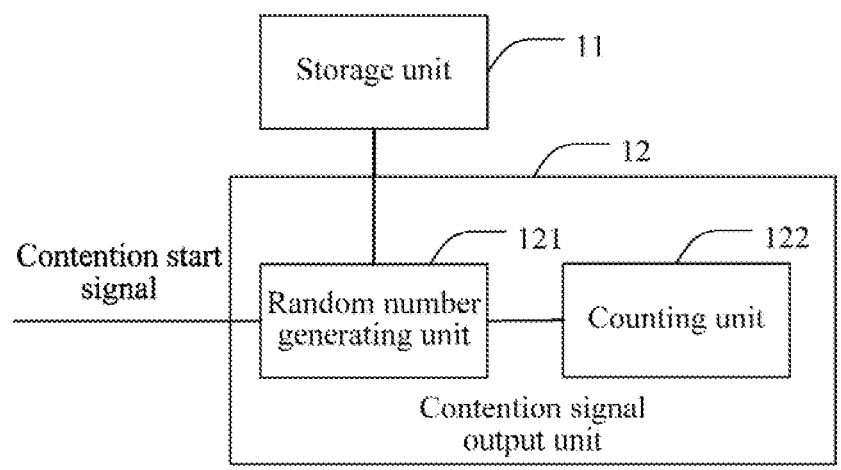
FIG. 4 is a preferred schematic view of a contention signal output unit of the device requiring address allocation consistent with the present invention.

As a preferred implementation, the contention signal output unit 12 includes a random number generating unit 121 and a counting unit 122, as shown in FIG. 4.

The random number generating unit 121 is used for generating a random number upon receiving the contention start signal when the address allocation flag information is that no address information is allocated. Preferably, the random number generating unit 121 may be implemented through a signal identification circuit, a comparison circuit and a first controlled random number generator. The signal identification circuit is used for identifying whether a signal input to the device 1a requiring address allocation is the contention start signal. Preferably, the signal identification circuit may be implemented through a signal register for storing the signal input to the device 1a requiring address allocation and a circuit for comparing the signal stored in the signal register with a predetermined contention start signal, such as a comparator, an XNOR gate or an XOR gate. The comparison circuit is used for comparing address allocation flag information stored in the storage unit 11 with predefined address allocation flag information indicating that no address information is allocated. Preferably, the comparison circuit may be implemented through an XNOR gate or an XOR gate. A controlled terminal of the first controlled random number generator is connected to output terminals of the signal identification circuit and the comparison circuit, and when the signal identification circuit identifies that the input signal is the contention start signal and the comparison circuit determines that the address allocation flag information stored in the storage unit 11 is identical to the predefined address allocation flag information indicating that no address information is allocated, the first controlled random number generator generates a random number.

The counting unit 122 counts based on the random number generated by the random number generating unit 121 and outputs the address contention signal after a random duration.

Preferably, the counting unit 122 may be implemented through a down counter or an accumulator. For example, the down counter counts down from the random number generated by the random number generating unit 121, and outputs an address contention signal when counting to a first predetermined value such as 0. For another example, the accumulator counts up from a second predetermined value such as 0, and outputs an address contention signal when counting to the random number generated by the random number generating unit 121.

Figure 5:
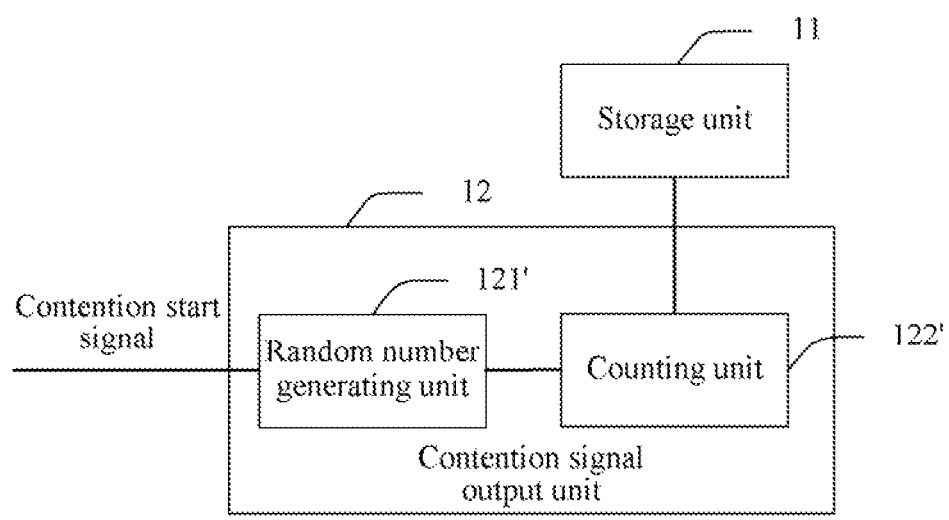
FIG. 5 is another preferred schematic view of a contention signal output unit of the device requiring address allocation consistent with the present invention.

As another preferred implementation, the contention signal output unit 12 includes a random number generating unit 121' and a counting unit 122', as shown in FIG. 5.

The random number generating unit 121' is used for generating a random number upon receiving the contention start signal. Preferably, the random number generating unit 121' may be implemented through the signal identification circuit and a second controlled random number generator. The difference between the second controlled random number generator and the first controlled random number generator only lies in that, the second controlled random number generator is controlled by a signal output by the signal identification circuit, that is, when the signal identification circuit identities that a signal input to the device 1a requiring address allocation is the contention start signal, the second controlled random number generator generates a random number.

The counting unit 122' is connected to the storage unit 11, and used for counting based on the random number generated by the random number generating unit 121' and outputting an address contention signal after a random duration, when the address allocation flag information is that no address information is allocated. The counting unit 122' may be implemented through a trigger down counter or accumulator. For example, the address allocation flag information stored in the storage unit 11 is input to a trigger terminal of the trigger down counter, and when the input address allocation flag information stored in the storage unit 11 is that no address information is allocated, the trigger down counter counts down from the random number generated by the random number generating unit 121', and outputs an address contention signal when counting to a third predetermined value. For another example, the address allocation flag information is input to a trigger terminal of the trigger accumulator, and when the input address allocation flag information is that no address information is allocated, the trigger accumulator counts up from a fourth predetermined value, and outputs the address contention signal when counting to the random number generated by the random number generating unit 121'.

Figure 6:
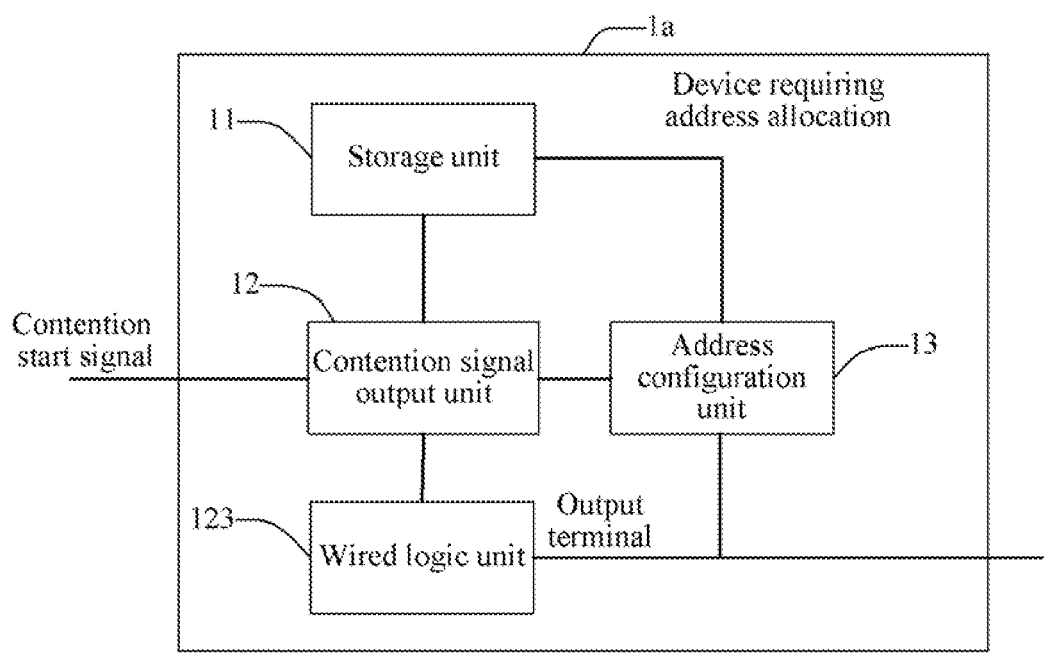
FIG. 6 is a preferred schematic view of a device requiring address allocation consistent with the present invention.

Moreover, as a preferred implementation of the present invention, the device requiring address allocation further includes a wired logic unit 123, as shown in FIG. 6.

The wired logic unit 123 is connected to an output terminal of the contention signal output unit 12, so that after an output terminal of the wired logic unit 123 is connected with output terminals of wired logic units of other devices requiring address allocation, an interconnect signal line forms a wired-AND logic or a wired-OR logic. Preferably, the wired logic unit 123 may be implemented through a switch tube, where the switch tube includes a triode, a field effect transistor and the like.

Figure 7:
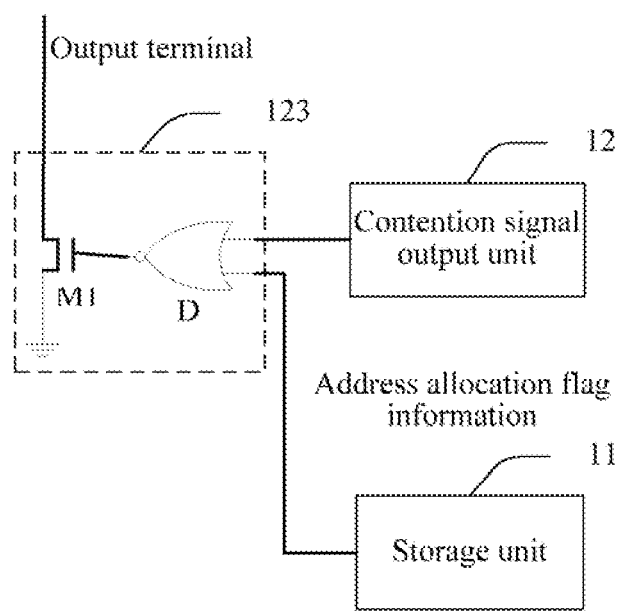
FIG. 7 is a preferred schematic view of a wired logic unit of the device requiring address allocation consistent with the present invention.
Figure 8:
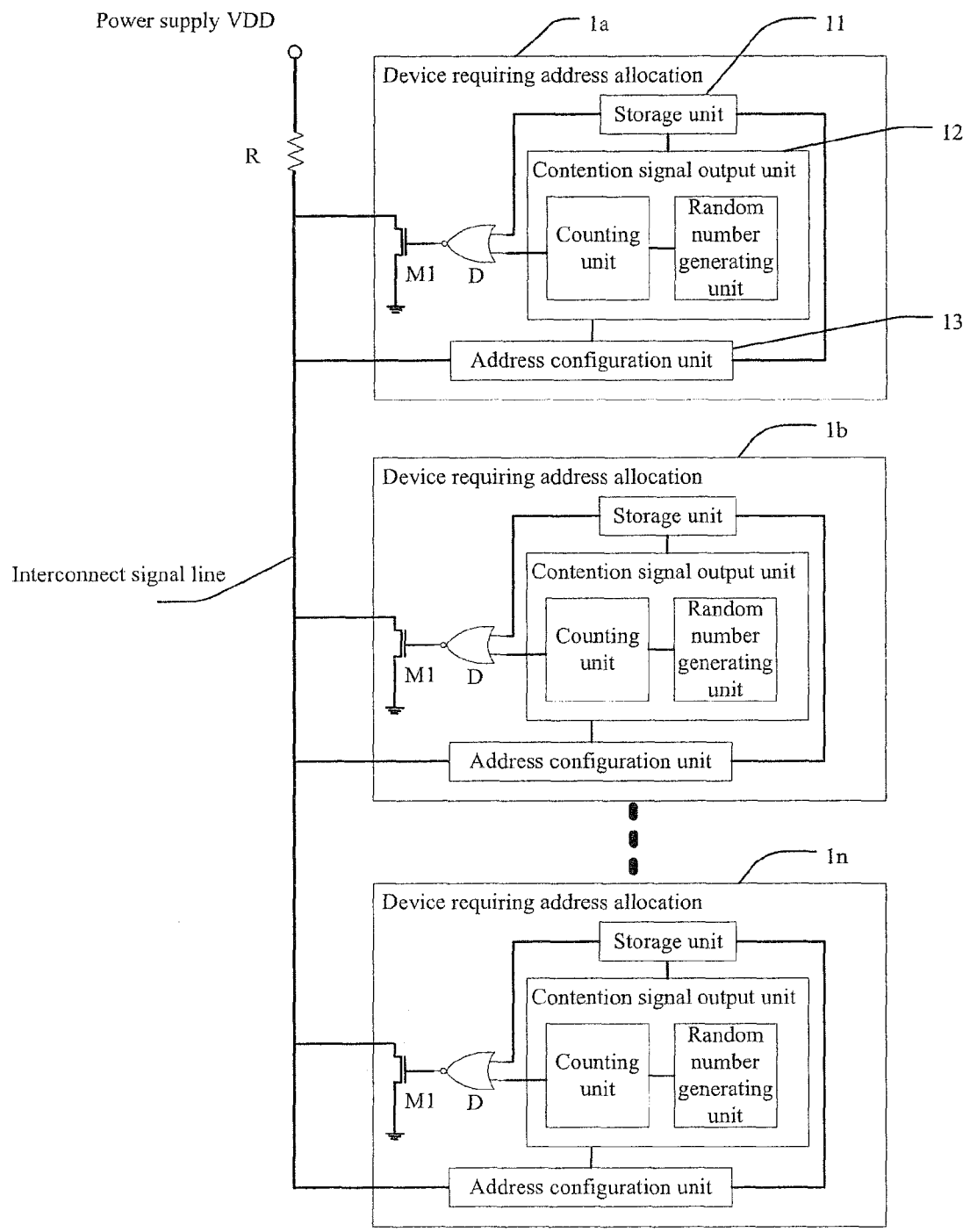
FIG. 8 is a schematic view of a wired-AND logic of contention signal output units of a plurality of devices requiring address allocation consistent with the present invention.

For example, as shown in FIG. 7, the wired logic unit 123 includes an NOR gate D and a switch tube M1, where the signal output by the contention signal output unit 12 is input to one input terminal of the NOR gate D, the address allocation flag information stored in the storage unit 11 is input to the other input terminal of the NOR gate D, and the switch tube M1 has a gate electrode connected to an output terminal of the NOR gate D, a grounded source electrode, and a drain electrode serving as an output terminal. When the drain electrode of the switch tube M1 serving as the output terminal of the wired logic unit 123 is connected to output terminals of wired logic units of other devices requiring address allocation, a wired-AND logic is formed. As shown in FIG. 8, the drain electrode of the switch tube M1 of the device 1a requiring address allocation is connected to drain electrodes of switch tubes M1 of devices 1b, . . . , and 1n requiring address allocation, and is connected to a power supply voltage VDD through a resistance R, so that when the device 1a requiring address allocation outputs the address contention signal to cut off the switch tube M1, if all of the devices 1b, . . . , and 1n requiring address allocation have output an address contention signal to cut off the respective switch tubes M1 thereof, the interconnect signal line is at a high level; and if at least one of the devices 1b, . . . , and 1n requiring address allocation has not output the address contention signal, the at least one switch tube M1 is switched on, and accordingly the interconnect signal line is at a low level, thus forming a wired-AND logic.

Figure 9:
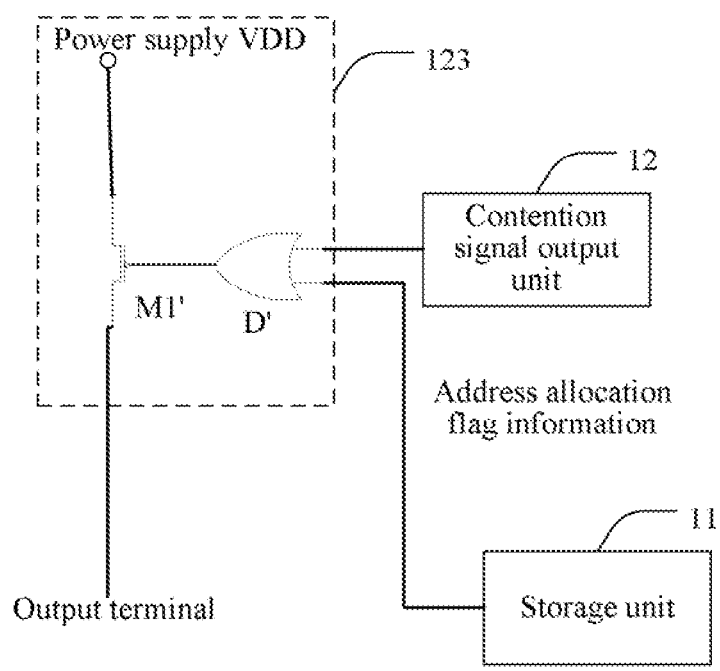
FIG. 9 is another preferred schematic view of a wired logic unit of the device requiring address allocation consistent with the present invention.
Figure 10:
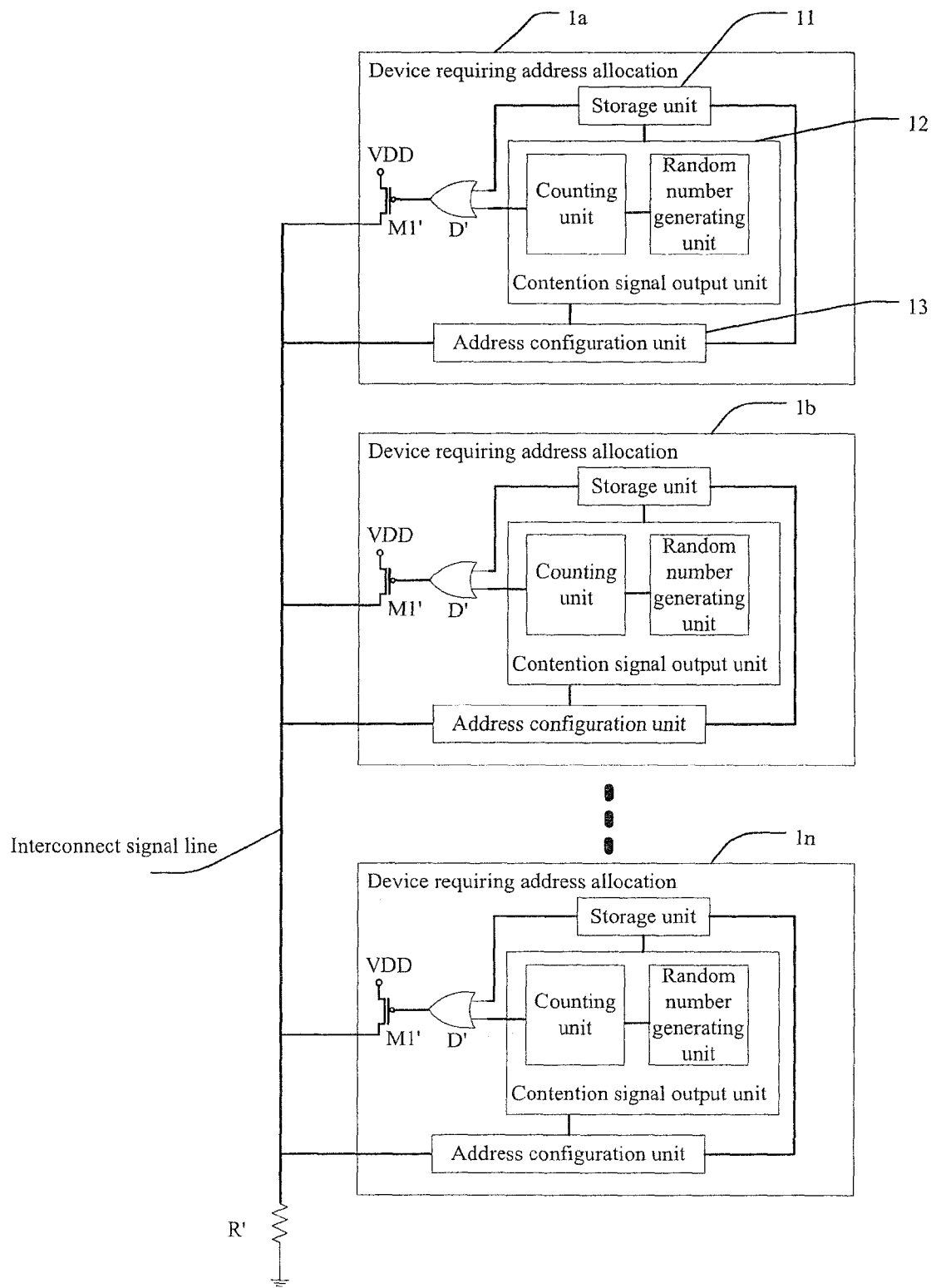
FIG. 10 is a schematic view of a wired-OR logic of contention signal output units of a plurality of devices requiring address allocation consistent with the present invention.

For another example, as shown in FIG. 9, the wired logic unit 123 includes an OR gate D' and a switch tube M1', where the signal output by the contention signal output unit 12 is input to one input terminal of the OR gate D', the address allocation flag information stored in the storage unit 11 is input to the other input terminal of the OR gate D', and the switch tube M1' has a gate electrode connected to an output terminal of the OR gate D', a source electrode connected to a power supply, and a drain electrode serving as an output terminal. When the drain electrode of the switch tube M1' serving as the output terminal of the wired logic unit 123 is connected to output terminals of wired logic units of other devices requiring address allocation, a wired-OR logic is formed. As shown in FIG. 10, the drain electrode of the switch tube M1' of the device 1a requiring address allocation is connected to switch tubes M1' of devices 1b, . . . , and 1n requiring address allocation, and is grounded through a resistance R', so that when the device 1a requiring address allocation outputs the address contention signal to cut off the switch tube M1', if all of the devices 1b, . . . , and 1n requiring address allocation have output an address contention signal to cut off the respective switch tubes M1' thereof, the interconnect signal line is at a low level; and if at least one of the devices 1b, . . . , and 1n requiring address allocation has not output the address contention signal, the at least one switch tube M1' is switched on, and accordingly the interconnect signal line is at a high level, thus forming a wired-OR logic.

The address configuration unit 13 is used for determining, when the contention signal output unit 12 outputs the address contention signal, whether pre-allocated address information is available according to whether the devices with address allocation flag information being that no address information is allocated among the devices 1b, . . . , and 1n requiring address allocation already output address contention signals, and when the pre-allocated address information is available, writing the pre-allocated address information to the storage unit, and modifying the address allocation flag information to that address information is already allocated.

When the device 1a requiring address allocation does not include the wired logic unit, but instead a wired logic unit connected to the output terminal of the contention signal output unit 12 is disposed external to the device 1a requiring address allocation, the address configuration unit 13 determines whether the pre-allocated address information is available according to a level of an interconnect signal line connected to an output terminal of the external wired logic unit, when the contention signal output unit 12 outputs the address contention signal; and when the device 1a requiring address allocation includes the wired logic unit, the address configuration unit 13 directly determines whether the pre-allocated address information is available according to a level of an interconnect signal line connected to the output terminal of the contention signal output unit 12, when the contention signal output unit 12 outputs the address contention signal.

For example, as shown in FIG. 8, when the contention signal output unit 12 of the device 1a requiring address allocation outputs the address contention signal to cut off the switch tube M1, the address configuration unit 13 of the device 1a requiring address allocation determines that the interconnect signal line is at a high level, indicating that the devices 1b, . . . , and 1n requiring address allocation have been allocated with addresses (that is, the address allocation flag information thereof is that address information is already allocated), or have output the address contention signals thereof before the contention signal output unit 12 of the device 1a requiring address allocation outputs the address contention signal, and therefore, the address configuration unit 13 of the device 1a requiring address allocation determines that the pre-allocated address information is available; otherwise, it indicates that at least one of the devices 1b, . . . , and 1n requiring address allocation has not output the address contention signal when the contention signal output unit 12 of the device 1a requiring address allocation outputs the address contention signal, and therefore, the address configuration unit 13 of the device 1a requiring address allocation determines that the pre-allocated address information is not available.

For another example, as shown in FIG. 10, when the contention signal output unit 12 of the device 1a requiring address allocation outputs the address contention signal to cut off the switch tube M1', the address configuration unit 13 of the device 1a requiring address allocation determines that the interconnect signal line is at a low level, indicating that the devices 1b, . . . , and 1n requiring address allocation have been allocated with addresses (that is, the address allocation flag information thereof is that address information is already allocated), or have output the address contention signals thereof before the contention signal output unit 12 of the device 1a requiring address allocation outputs the address contention signal, and therefore, the address configuration unit 13 of the device 1a requiring address allocation determines that the pre-allocated address information is available; otherwise, it indicates that at least one of the devices b, . . . , and 1n requiring address allocation has not output the address contention signal when the contention signal output unit 12 of the device 1a requiring address allocation outputs the address contention signal, and therefore, the address configuration unit 13 of the device 1a requiring address allocation determines that the pre-allocated address information is not available.

Preferably, the address configuration unit 13 may be implemented through a circuit such a comparator or an XNOR gate.

Moreover, as a preferred implementation of the present invention, the device requiring address allocation further includes an interconnect line level output unit (not shown), a modification unit (not shown) and a delay unit (not shown).

The interconnect line level output unit is used for, upon receiving the contention start signal, outputting a signal for enabling a level of the output terminal of the wired logic unit included in the device 1a requiring address allocation to be a first level if the address allocation flag information is that address information is already allocated, and outputting a signal for enabling the level of the output terminal of the wired logic unit included in the device 1a requiring address allocation to be a second level if the address allocation flag information is that no address information is allocated.

For example, as shown in FIG. 7, the first level is a high level, and the second level is a low level. When the signal identification circuit included in the random number generating unit in the contention signal output unit 12 identifies that a signal input to the device 1a requiring address allocation is the contention start signal and the address allocation flag information stored in the storage unit 11 is that address information is already allocated, the interconnect line level output unit outputs a signal for cutting off the switch tube M1, and accordingly, the output terminal of the wired logic unit is at the first level (that is, high level); while if the address allocation flag information stored in the storage unit 11 is that no address information is allocated, the interconnect line level output unit outputs a signal for switching on the switch tube M1, and accordingly, the output terminal of the wired logic unit is at the second level (that is, low level).

For another example, as shown in FIG. 9, the first level is a low level, and the second level is a high level. When the signal identification circuit included in the random number generating unit in the contention signal output unit 12 identifies that a signal input to the device 1a requiring address allocation is the contention start signal and the address allocation flag information stored in the storage unit 11 is that address information is already allocated, the interconnect line level output unit outputs a signal for cutting off the switch tube M1', and accordingly, the output terminal of the wired logic unit is at the low level; while if the address allocation flag information stored in the storage unit 11 is that no address information is allocated, the interconnect line level output unit outputs a signal for switching on the switch tube M1', and accordingly, the output terminal of the wired logic unit is at the high level.

Based on the above description, those with ordinary skill in the art should understand that the interconnect line level output unit may be implemented by a trigger circuit, or implemented by an AND gate and a controlled switch.

The modification unit is used for modifying the address allocation flag information to that no address information is allocated, upon receiving a signal for modifying the address allocation flag information to that no address information is allocated.

For example, the modification unit compares the signal input to the device 1a requiring address allocation and stored in the signal register with a predefined signal for modifying the address allocation flag information to that no address information is allocated, so as to identify whether the signal input to the device 1a requiring address allocation is the signal for modifying the address allocation flag information to that no address information is allocated. Based on the above description, those with ordinary skill in the art should understand that the modification unit may be implemented through a comparator, an XNOR gate or an XOR gate and a write signal circuit.

The delay unit is used for outputting an activating signal to activate the contention signal output unit 12 after a predetermined delay after the contention start signal is received, so that the contention signal output unit 12 outputs an address contention signal after a random duration after the predetermined delay after the contention start signal is received.

As a preferred implementation, the delay unit has an input terminal connected to the output terminal of the signal identification circuit, and an output terminal connected to an input terminal of the random number generating unit 121 shown in FIG. 4 or an input terminal of the random number generating unit 121' shown in FIG. 5, and when the signal identification circuit identifies that a signal input to the device 1a requiring address allocation is the contention start signal, the delay unit outputs an activating signal after a predetermined delay, so that the random number generating unit 121 or the random number generating unit 121' generates a random number under the control of the activating signal, and the contention signal output unit 12 outputs an address contention signal after a random duration after the predetermined delay after the contention start signal is received.

As another preferred implementation, the delay unit has an input terminal connected to the output terminal of the signal identification circuit, and an output terminal connected to an input terminal of the counting unit 122 shown in FIG. 4 or an input terminal of the counting unit 122' shown in FIG. 5, and when the signal identification circuit identifies that a signal input to the device 1a requiring address allocation is the contention start signal, the delay unit outputs an activating signal after a predetermined delay, so that the counting unit 122 or the counting unit 122' starts counting under the control of the activating signal, and the contention signal output unit 12 outputs an address contention signal after a random duration after the predetermined delay after the contention start signal is received.

Preferably, the delay unit may be implemented through a delay line.

It should be noted that, those with ordinary skill in the art should understand that the wired logic unit shown above is merely for illustrative purposes and is not intended to limit the present invention; in fact, any circuit structure should fall within the scope of the present invention, as long as when a device requiring address allocation outputs an address contention signal, the level of the interconnect signal line is a level indicating that address information is available only if all other devices requiring address allocation have output the address contention signals thereof. Moreover, the contention signal output unit shown above is merely for illustrative purposes and is not intended to limit the present invention; in fact, any circuit structure that outputs an address contention signal after a random duration after the contention start signal is received when the address allocation flag information is that no address information is allocated should fall within the scope of the present invention. Furthermore, based on the above description, those with ordinary skill in the art should understand circuit structures of the random number generator, the first controlled random number generator and the second controlled random number generator.

Moreover, it should further be noted that, those with ordinary skill in the art should understand that in application, the device 1a requiring address allocation may include other circuit structures as required in actual application, for example, when being used as a data buffer in a memory module, the device 1a requiring address allocation may further include a data register, a control instruction register, a register controller and the like.

Figure 11:
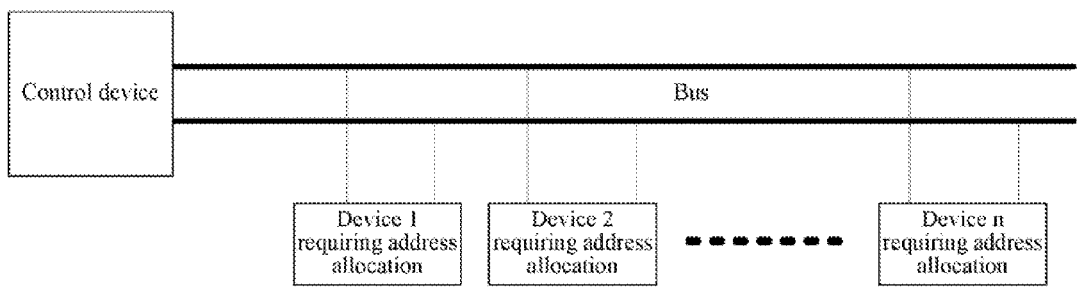
FIG. 11 is a schematic view of a device system consistent with the present invention.

FIG. 11 is a schematic view of a device system provided in the present invention. The device system includes a plurality of devices 1, 2, . . . , and n requiring address allocation, connected based on a bus, and a control device connected to the bus. The structure of the devices 1, 2, . . . , and n requiring address allocation is the same as or similar to that of the device 1a requiring address allocation, and is incorporated herein by reference, so the details will not be described herein.

Preferably, the output terminals of the contention signal output units of the devices 1, 2, . . . , and n requiring address allocation are connected to one another to form a wired-AND logic or a wired-OR logic.

Preferably, when the devices 1, 2, . . . , and n requiring address allocation are used as data buffers and the control device is used as a control buffer, the device system may be used as a memory module.

Figure 12:
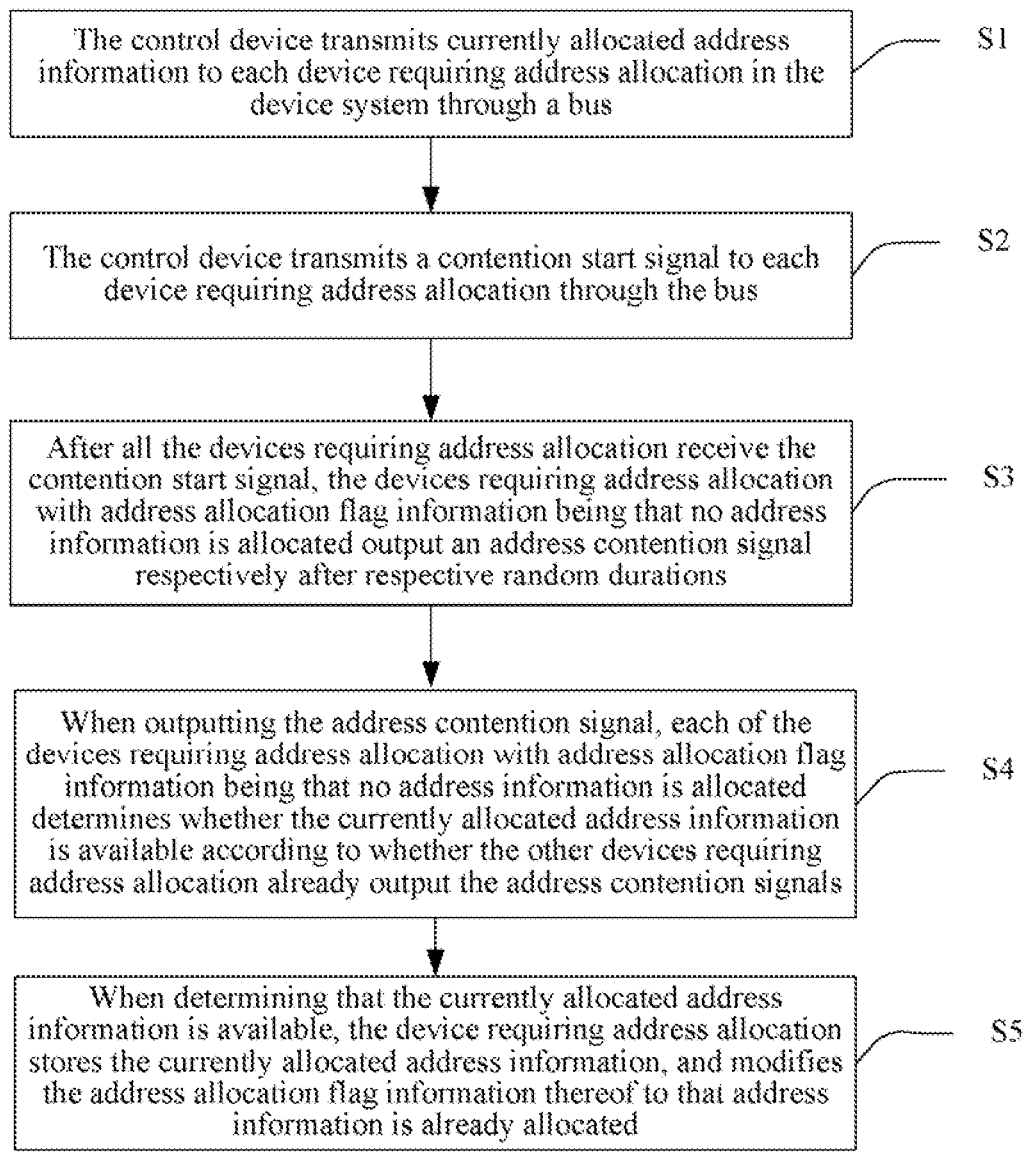
FIG. 12 is a flow chart of an address allocation method consistent with the present invention.

FIG. 12 is a flow chart of an address allocation method of the device system shown in FIG. 11.

In Step S1, the control device in the device system transmits currently allocated address information to the devices 1, 2, . . . , and n requiring address allocation in the device system through the bus. For example, the control device in the device system transmits currently allocated address information "0" to the devices 1, 2, . . . , and n requiring address allocation in the device system through the bus.

In Step S2, the control device transmits a contention start signal to the devices 1, 2, . . . , and n requiring address allocation through the bus.

Afterwards, in Step S3, after the devices 1, 2, . . . , and n requiring address allocation receive the contention start signal, the devices requiring address allocation with address allocation flag information being that no address information is allocated output an address contention signal respectively after respective random durations.

For example, after the devices 1, 2, . . . , and n requiring address allocation receive the contention start signal, the contention signal output unit of the device 1 requiring address allocation with address allocation flag information being that no address information is allocated outputs an address contention signal after a random duration of for example 2 minutes, the contention signal output unit of the device 2 requiring address allocation with address allocation flag information being that no address information is allocated outputs an address contention signal after a random duration of for example 1 minute, . . . , and the contention signal output unit of the device n requiring address allocation with address allocation flag information being that no address information is allocated outputs an address contention signal after a random duration of for example 3 minutes.

Afterwards, in Step S4, when outputting the address contention signal, each of the devices requiring address allocation with address allocation flag information being that no address information is allocated determines whether the currently allocated address information is available according to whether the other devices requiring address allocation with address allocation flag information being that no address information is allocated already output the address contention signals.

For example, when the signals output by the contention signal output units of the devices 1, 2, . . . , and n requiring address allocation form a wired-AND logic, as shown in FIG. 8, at the same time when the contention signal output unit of the device 1 requiring address allocation with address allocation flag information being that no address information is allocated outputs an address contention signal, the address configuration unit of the device 1 requiring address allocation reads a level of an interconnect signal line. If the level is a high level, indicating that the devices 2, . . . , and n requiring address allocation have been allocated with addresses (that is, the address allocation flag information thereof is that address information is already allocated), or have output the address contention signals thereof before the contention signal output unit of the device 1 requiring address allocation outputs the address contention signal, the device 1 requiring address allocation determines that the currently allocated address information is available; otherwise, determines that the currently allocated address information is not available.

For another example, when the signals output by the contention signal output units of the devices 1, 2, . . . , and n requiring address allocation form a wired-OR logic, as shown in FIG. 10, at the same time when the contention signal output unit of the device 1 requiring address allocation with address allocation flag information being that no address information is allocated outputs an address contention signal, the address configuration unit of the device 1 requiring address allocation reads a level of an interconnect signal line. If the level is a low level, indicating that the devices 2, . . . , and n requiring address allocation have been allocated with addresses (that is, the address allocation flag information thereof is that address information is already allocated), or have output the address contention signals thereof before the contention signal output unit of the device 1 requiring address allocation outputs the address contention signal, the device 1 requiring address allocation determines that the currently allocated address information is available; otherwise, determines that the currently allocated address information is not available.

Afterwards, in Step S5, when determining that the currently allocated address information is available, the device requiring address allocation stores the currently allocated address information, and modifies the address allocation flag information thereof to that address information is already allocated.

For example, in Step S4, the device n requiring address allocation determines that the currently allocated address information such as an address "0" is available, and accordingly, the address configuration unit of the device n requiring address allocation writes the address "0" to the storage unit of the device n requiring address allocation, and modifies the address allocation flag information in the storage unit to that address information is already allocated. Thus, allocation of the address "0" is completed.

Afterwards, Steps S1 to S5 are repeated to complete allocation of a next address, until all the devices 1, 2, . . . , and n requiring address allocation are allocated with addresses.

It should be noted that, the order of Steps S1 and S2 and the order of Steps S3 and S4 are not limited to the above, but for example, the control device may execute Steps S1 and S2 at the same time, that is, the control device transmits a contention start signal for starting allocation of a certain address such as an address "0" through the bus; or, Step S2 may be executed after Step S3 or S4.

Moreover, preferably, according to the method consistent with the present invention, Step S3 further includes Step S31 (not shown), and the method consistent with the present invention further includes Step S6 (not shown).

In Step S31, after the devices 1, 2, . . . , and n requiring address allocation receive the contention start signal, each of the devices requiring address allocation with address allocation flag information being that address information is already allocated outputs a signal for enabling a level of an output terminal of a wired logic unit included in the device requiring address allocation to be a first level, each of the devices requiring address allocation with address allocation flag information being that no address information is allocated outputs a signal for enabling a level of an output terminal of a wired logic unit included in the device requiring address allocation to be a second level, and the devices requiring address allocation with address allocation flag information being that no address information is allocated output an address contention signal respectively after respective random durations after a predetermined delay after receiving the contention start signal.

For example, during $m^{th}$ address allocation, after the devices 1, 2, . . . , and n requiring address allocation receive the contention start signal, each of the devices 1, 2, . . . , and m+1 requiring address allocation with address allocation flag information being that address information is already allocated outputs a signal for enabling a level of an output terminal of a wired logic unit included in the device requiring address allocation to be a first level, each of the devices m, m+1, . . . , and n requiring address allocation with address allocation flag information being that no address information is allocated outputs a signal for enabling a level of an output terminal of a wired logic unit included in the device requiring address allocation to be a second level, and the device m requiring address allocation outputs an address contention signal after 5 seconds (predetermined delay)+100 seconds (random duration generated by the device) after the contention start signal is received, the device m+1 requiring address allocation outputs an address contention signal after 5 seconds (predetermined delay)+30 seconds (random duration generated by the device) after the contention start signal is received, . . . , and the device n requiring address allocation outputs an address contention signal after 5 seconds (predetermined delay)+200 seconds (random duration generated by the device) after the contention start signal is received.

For another example, during $k^{th}$ (k is smaller than n) address allocation, after the devices 1, 2, . . . , and n requiring address allocation receive the contention start signal, each of the devices 1, 2, . . . , and n requiring address allocation with address allocation flag information being that address information is already allocated outputs a signal for enabling a level of an output terminal of a wired logic unit included in the device requiring address allocation to be a first level.

In Step S6, if the control device determines that the level of the interconnect signal line is the first level after a predetermined duration after transmitting the contention start signal through the bus, the control device transmits a signal for modifying the address allocation flag information to that no address information is allocated to each device requiring address allocation through the bus, so as to implement address re-allocation starting from first address information. The predetermined duration is shorter than the time length of the predetermined delay.

For example, during $j^{th}$ (j is smaller than n) address allocation, after the devices 1, 2, . . . , and n requiring address allocation receive the contention start signal, each of the devices 1, 2, . . . , and n requiring address allocation outputs a signal for enabling a level of an output terminal of a wired logic unit included in the device requiring address allocation to be a first level, and accordingly, the interconnect signal line is at the first level, which indicates that the devices 1, 2, . . . , and n requiring address allocation are already allocated with addresses; however, in fact, allocation of only j−1 addresses is completed, and as a result, a plurality of devices among the devices 1, 2, . . . , and n requiring address allocation is allocated with the same address. The reason is that a plurality of devices requiring address allocation generates the same random number during the same address allocation process, so that the plurality of devices requiring address allocation uses the same address information as addresses thereof, resulting in that the allocation of j−1 addresses is invalid, and address re-allocation needs to be performed starting from the first address. Therefore, the control device transmits a signal for modifying the address allocation flag information to that no address information is allocated to the devices 1, 2, . . . , and n requiring address allocation through the bus, so that the devices 1, 2, . . . , and n requiring address allocation modify the address allocation flag information thereof to that no address information is allocated respectively, and Steps S1 to S5 are repeated, so as to implement address re-allocation starting from first address information.

It should be noted that, if the control device determines that the level of the interconnect signal line is not the first level after the predetermined duration after transmitting the contention start signal through the bus, the control device repeats Steps S1 to S5 to perform next address allocation after the current address allocation is finished.

In summary, in the present invention, devices requiring address allocation acquire addresses based on a contention mechanism, and as long as the selection of the random number generating units of the devices requiring address allocation is proper, it can be ensured that random numbers generated by the devices requiring address allocation are different from one another, thereby ensuring that during allocation of each address information, only one device requiring address allocation can use the address information as address information thereof. Once a device requiring address allocation determines address information thereof, the address allocation flag information thereof is modified to be that address information is already allocated, and accordingly, the device requiring address allocation exits the contention mechanism (that is, no longer outputs the address contention signal). Thus, allocation of an address to each device requiring address allocation connected based on a bus is achieved. Moreover, during allocation of one address, once two or more devices requiring address allocation generate the same random number, the two or more devices requiring address allocation will be allocated with the same address. To solve this problem, the present invention further introduces the interconnect line level output unit, to enable the control device to determine according to the level of the interconnect signal line whether different devices requiring address allocation are allocated with the same address, thereby further ensuring the reliability of acquiring addresses based on contention. Apparently, in the present invention, address allocation does not require the matching device in the prior art, but can be performed simply through an apparatus capable of sending contention start signals, so that the address allocation is quite convenient, and especially for address allocation for data buffers in a memory module, the address allocation can be performed directly by a control buffer in a memory buffer without requiring any memory controller, thereby facilitating a tester to test or calibrate the memory module. Therefore, the present invention effectively overcomes the disadvantages in the prior art, and has high industrial applicability.

The above description of the detailed embodiments is only to illustrate the preferred implementation according to the present invention, and it is not to limit the scope of the present invention. Accordingly, all modifications and variations completed by those with ordinary skill in the art should fall within the scope of the present invention defined by the appended claims.

What is claimed is:

1. A device requiring address allocation, the device comprising:
   a storage unit configured to store address allocation flag information and address information;
   a contention signal output unit connected to the storage unit, and configured to output an address-contention signal to the device after a random duration in response to receiving a contention-start signal and when the address allocation flag information indicates that no address information is allocated; and
   an address configuration unit configured to: (i) determine whether pre-allocated address information is available in response to the contention signal output unit outputting the address-contention signal by determining whether other devices requiring address allocation with address allocation flag information indicating that no address information is allocated are already outputting address-contention signals, (ii) write the pre-allocated address information to the storage unit when the pre-allocated address information is available, and (iii) modify the address allocation flag information to indicate that address information is already allocated.

2. The device requiring address allocation as in claim 1, wherein the device requiring address allocation is a data buffer.

3. The device requiring address allocation as in claim 1, further comprising:
   a wired logic unit connected to an output terminal of the contention signal output unit such that after an output terminal of the wired logic unit is connected with other output terminals of other wired logic units of other devices requiring address allocation, an interconnect signal line between the wired logic unit and the other wired logic units forms a wired-AND logic or a wired-OR logic.

4. The device requiring address allocation as in claim 3, further comprising:
   an interconnect line level output unit configured: (1) to output a signal in response to receiving the contention-start signal enabling a level of the output terminal of the wired logic unit in the device requiring address allocation to be a first level if the address allocation flag information is that address information is already allocated, and (2) to output a signal enabling the level of the output terminal of the wired logic unit in the device requiring address allocation to be a second level if the address allocation flag information is that no address information is allocated;

a modification unit configured to modify the address allocation flag information to indicate that no address information is allocated, upon receiving a signal modifying the address allocation flag information to indicate that no address information is allocated; and a delay unit configured to output an activating signal to activate the contention signal output unit after a predetermined delay after the contention-start signal is received, so that the contention signal output unit outputs an address-contention signal after a random duration after the predetermined delay in response to receiving the contention-start signal.

5. A device system, comprising:

a plurality of devices requiring address allocation as in claim 1, the plurality of devices being connected through a bus; and a control device connected to the bus.

6. The device system as in claim 5, wherein each device requiring address allocation is a data buffer, the control device is a control buffer, and the device system is a memory module.

7. An address allocation method, applied to the device system as in claim 5, the address allocation method comprising:

a) the control device being configured to transmit currently allocated address information to each device requiring address allocation in the device system through the bus; and the address allocation method further comprising:

b) the control device being configured to transmit the contention-start signal to each device requiring address allocation through the bus;

c) after all the devices requiring address allocation receive the contention-start signal, outputting the address-contention signal respectively after respective random durations by the devices requiring address allocation with address allocation flag information indicating that no address information is allocated;

d) when outputting the address-contention signal, determining whether the currently allocated address information is available according to whether the other devices requiring address allocation with address allocation flag information indicating that no address information is allocated are already outputting the address-contention signals by each of the devices requiring address allocation with address allocation flag information indicating that no address information is allocated; and e) when determining that the currently allocated address information is available, the device requiring address allocation storing the currently allocated address information, and modifying the address allocation flag information thereof to indicate that address information is already allocated.

8. The address allocation method as in claim 7, further comprising:

repeating the steps a), b), c), d) and e) to complete allocation of a next address, until all the devices requiring address allocation are allocated with addresses.

9. The address allocation method as in claim 7, wherein when signals output by respective contention signal output units of all the devices requiring address allocation form a wired-AND logic or a wired-OR logic, the device requiring address allocation determines that the currently allocated address information is available according to a level of an interconnect signal line of the wired-AND logic or the wired-OR logic, when outputting the address-contention signal.

10. The address allocation method as in claim 9, wherein the step 2) further comprises:

after all the devices requiring address allocation receive the contention-start signal, each of the devices requiring address allocation with address allocation flag information indicating that address information is already allocated outputting a signal enabling a level of an output terminal of a wired logic unit in the device requiring address allocation to be a first level, each of the devices requiring address allocation with address allocation flag information being that no address information is allocated outputting a signal enabling the level of the output terminal of a wired logic unit in the device requiring address allocation to be a second level, and the devices requiring address allocation with address allocation flag information being that no address information is allocated outputting an address-contention signal respectively after respective random durations after a predetermined delay after receiving the contention-start signal;

the address allocation method further comprising:

if the control device determines that the level of the interconnect signal line is the first level after a predetermined duration after transmitting the contention-start signal through the bus, the control device transmitting a signal modifying the address allocation flag information to indicate that no address information is allocated to each device requiring address allocation through the bus.

* * * * *